United States Patent
Trew et al.

(10) Patent No.: US 6,173,077 B1
(45) Date of Patent: Jan. 9, 2001

(54) IMAGE SEGMENTATION

(75) Inventors: Timothy I. P. Trew; Richard D. Gallery, both of Horley (GB)

(73) Assignee: U.S. Philips Corporation, New York, NY (US)

( * ) Notice: Under 35 U.S.C. 154(b), the term of this patent shall be extended for 0 days.

(21) Appl. No.: 08/966,600

(22) Filed: Nov. 10, 1997

(30) Foreign Application Priority Data

Nov. 13, 1996 (GB) .................................................. 9623573

(51) Int. Cl.$^7$ ...................................................... G06K 9/36
(52) U.S. Cl. ........................... 382/236; 382/232; 382/238
(58) Field of Search ................................... 382/232, 242, 382/241, 236, 238; 348/699, 416, 398

(56) References Cited

U.S. PATENT DOCUMENTS

| | | | |
|---|---|---|---|
| 5,565,920 | * 10/1996 | Lee et al. ............................... | 348/398 |
| 5,572,258 | 11/1996 | Yokoyama ........................... | 348/415 |
| 5,774,591 | * 6/1998 | Black et al. .......................... | 382/236 |
| 5,778,192 | * 7/1998 | Schuster et al. ..................... | 382/232 |

FOREIGN PATENT DOCUMENTS

| | | | |
|---|---|---|---|
| 0437002A2 | 7/1991 | (EP) | ................................. H04N/1/41 |
| 0454234A2 | 10/1991 | (EP) | ............................... G06K/15/66 |
| 0579319A2 | 1/1994 | (EP) | ................................. H04N/7/13 |
| 0707427A2 | 4/1996 | (EP) | ................................. H04N/7/26 |
| 08-149461 | 6/1996 | (JP) | ................................. H04N/7/24 |

OTHER PUBLICATIONS

"Motion Estimation and Compensation", by G. de Haan, 1992, ISBN 90–74445–01–2.
"Segmentation and Motion Estimation in Image Sequences" by Norbert Diehl (SPIE vol. 1260, Sensing and Reconstruction of Three-dimensional Objects and Scenes 1990).
Brice–Fennema technique, and is described in "Scene analysis using regions" (Artificial Intelligence 1 (1970) 205–226).
"Advances in Picture Coding" by Hans Musmann, Peter Pirsch and Hans Joachim Grallert (Proceedings of the IEEE, Vo. 73, No. 4, Apr. 1995).

* cited by examiner

Primary Examiner—Jose L Couso
Assistant Examiner—Anh Hong Do
(74) Attorney, Agent, or Firm—Russell Gross

(57) ABSTRACT

An image encoder or other image processing apparatus includes a segmentation apparatus for assigning image pixels to regions, in accordance with predetermined criteria. The segmentation apparatus provides a temporally consistent segmentation throughout a motion picture sequence, and comprises: a motion compensation processor for predicting the segmentation for a current frame (F0) upon the basis of the segmentation (S1) of the preceding frame and estimated motion vectors (M); and a pixel identifier and reallocator for modifying the predicted segmentation in dependence upon the accuracy of pixel values (F0') predicted for the current frame on the basis of the motion vectors (M). In particular, for portions of the image where pixel values are not accurately predicted by the motion vectors, it is assumed that the predicted segmentation is invalid, and such portions are re-segmented and merged into the predicted segmentation to obtain the temporally consistent segmentation. In the embodiments, pixels on the borders of regions in the predicted segmentation are also considered and re-assigned to neighboring regions according to various criteria.

36 Claims, 9 Drawing Sheets

IMAGE SEGMENTATION

BACKGROUND OF THE INVENTION

The present invention relates to image segmentation with improved temporal consistency, and to image processing including steps dependent on segmentation.

An image is conventionally described by defining the attributes of each pixel of the image, in particular the pixel colour. In a monochrome image the attributes defining each pixel usually consist of the grey scale value of the pixel whereas in a colour image a plurality of colour component values need to be defined per pixel. The invention is not limited to these conventional images and attributes, however, and applies to any spatial attribute which can conveniently be represented in the form of a pixel array in two or more dimensions. Similarly, the concept of time and temporal consistency should be understood to include analogous dimensions, such as when segmentation of tomographic image "slices" is performed for a sequence of images over a third spatial dimension, not necessarily in a time sequence.

Image segmentation is a known technique which groups pixels into regions, each region containing only pixels having similar attributes. The technique has many applications particularly in the field of image coding (compression). Image coding schemes using image segmentation are particularly suitable for low data rate transmission of image motion. Typical data rates may be as low as 64 kbits/s. They are, therefore suitable for applications such as video-phones which require the transmission of real time video information down the narrow bandwidth of a telephone line. Even if the segmentation is not itself encoded, the segmentation can be useful, for example, to concentrate the available bandwidth on the 'important' parts of the image, such as the face of the person speaking. An image coding scheme which uses image segmentation explicitly is region and texture coding as described in published patent applications EP-A-0437002 (PHB 33610) and EP-A-0454234 (PHB 33626). When segmentation schemes are used for the coding of a series of frames in a motion picture, the visual artifacts which result from segmentation carried out on individual frames will change with each frame and may produce a subjectively very displeasing image sequence representation. It is therefore desirable that the segmentation be temporally consistent. That is to say that like groups of pixels should belong to like regions in succeeding frames. It should also be appreciated that image segmentation is not limited to use in image coding and can be used generally in diverse image processing applications such as image enhancement, object tracking, extraction of 3-D geometry from images, computer-aided animation and colourisation.

A known approach to the problem of temporally consistent image segmentation is to segment the image into regions of uniform motion to allow objects to be derived. It is then these objects for which motion vectors are calculated and output. Examples of such an approach are described in "Segmentation and Motion Estimation in Image Sequences" by Norbert Diehl (SPIE Volume 1260, Sensing and Reconstruction of Three-dimensional Objects and Scenes 1990) and in EP 0 579 319 (PHB 33802) in the name of the present applicant.

A problem with this approach is that it relies upon a satisfactory division of the image into its constituent objects. This in turn relies either upon prior knowledge of the objects likely to be present in the image or is derived from complex processing of plural subsequent image frames. If there is only minimal knowledge of such objects, the modelling becomes very difficult and the splitting of the image into such objects cannot be satisfactorily achieved. Failure to segment the image satisfactorily tends to produce subjectively very displeasing results. For example, in one experimental video-phone application it has even occurred that a nose grows from the forehead of the transmitted face. As previously stated, this approach requires a complicated and extensive database of object models and additionally the matching of such models to the objects in the image may require excessive computation. Thus this approach is not presently a reliable technique for general image coding.

SUMMARY OF THE INVENTION

The present invention aims to provide an approach to temporally consistent segmentation that does not require the specific modelling of objects in the image. The temporal consistency imposed by use of the invention can also reduce the computation involved when simplistic assumptions relating to the motion in the image sequence are made, by providing a mechanism to detect and correct errors when such assumptions are invalid.

The present invention, defined in the appended claims, enables the provision of a consistent segmentation for a series of related pictures, for example to produce temporal consistency to the segmentation of a motion picture sequence containing moving objects.

In embodiments disclosed herein, a method of segmentation comprises some or all of the following steps:

(a) segmenting the initial picture of the series to produce an initial segmentation which assigns the pixels of the picture among a plurality of regions;

(b) calculating motion vectors from the initial and next picture of the series;

(c) applying the motion vectors to the initial segmentation to produce a predicted segmentation for the next picture;

(d) using the initial picture and the motion vectors to obtain predicted pixel values of the next picture;

(e) identifying pixels for which the motion vectors are invalid by comparing the predicted and actual pixel values for the next frame;

(f) segmenting the identified pixels to create further picture regions;

(g) replacing parts of the predicted segmentation with the further picture regions to produce an improved segmentation for the next picture; and (h) repeating steps (b) to (g) using the next segmented picture as the initial picture and using the improved segmentation as the initial segmentation.

Prior to step (f), various heuristics may be applied to reduce the number of identified pixels, by allocating them to the same regions as neighbouring pixels, and/or to designate further pixels for consideration in step (f).

The segmentation performed in accordance with the present invention provides improved temporal consistency and therefore, although artifacts will still be present in the image segmentation, these will be consistent from frame to frame and hence their consequences will be less displeasing to a viewer.

For example, an embodiment of a method according to the present invention assumes that all interframe motion can be characterised as two-dimensional planar motion so that a conventional two-dimensional planar motion estimator, such as a block matching estimator, may be used to calculate the motion vectors for each pixel of the image. Not only is this assumption not generally valid for real-life sequences but, even if the interframe motion were to consist exclusively of two-dimensional planar motion, as the motion vectors are only calculated by the block, it is extremely unlikely that accurate motion vectors will be calculated for all the individual pixels in each block. In order to detect inaccurate motion vectors the embodiment calculates a displaced frame difference (DFD) of each pixel. The DFD represents per pixel the error between a frame and the estimate of that frame provided by the motion vectors based on the neighbouring frames. An excessive DFD may thus indicate that the motion vectors for a particular pixel are invalid. The DFD is then used to identify where the segmentation predicted by the motion vectors requires correction.

BRIEF DESCRIPTION OF THE DRAWING

Embodiments of the present invention will now be described, by way of example, with reference to the accompanying drawings in which.

DETAILED DESCRIPTION OF THE PREFERRED EMBODIMENTS

Figure 1:
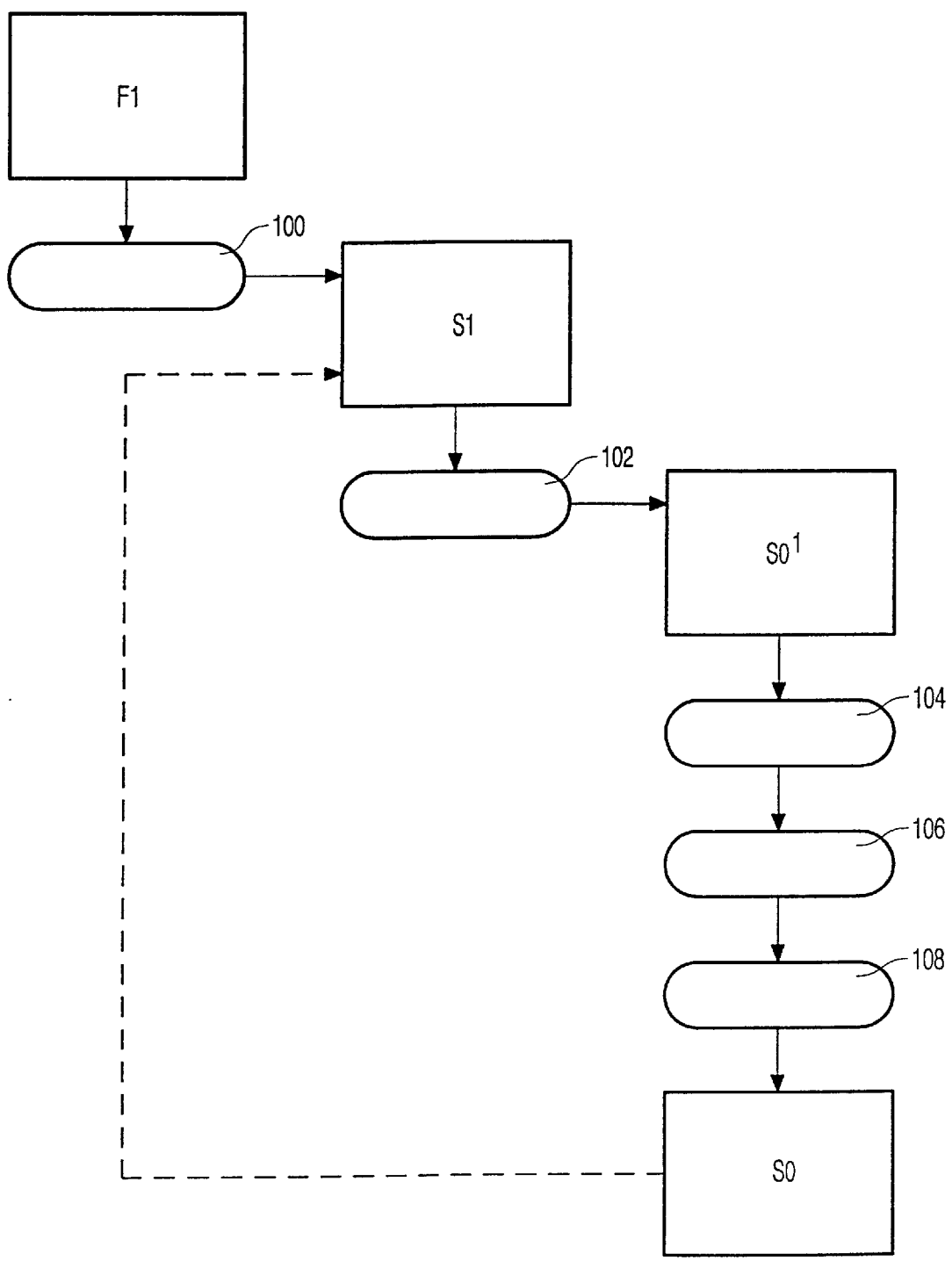
FIG. 1 is a block diagram providing an overview of the segmentation process in an embodiment of the present invention.

FIG. 1 provides an overview of the image segmentation process for a series of frames of a motion picture. In the described embodiment the image is monochrome, the intensity of each pixel being defined by a single grey scale value. The invention is not, however, limited to monochrome processing and the variations necessary to allow for a coloured image or any form of pixel array will be apparent to a person skilled in the art.

In the figure, process steps to be performed are designated by oval boxes and the major data structures involved by rectangular boxes.

F1 designates a pixel array of grey scale values for the frame at time t=n−1, that is to say the array contains a grey scale value of each pixel in the frame. It is assumed that the segmentations for frames F1 and F0 at (t=n) are to be produced with temporal consistency.

When frame F1 is the first frame of the series, it is subjected to an initial segmentation process 100 to provide segmentation data S1 in a manner to be described later.

In respect of the motion between frame F1 and the next frame F0 (being at time t=n), motion vectors M are calculated in a conventional manner described below more fully with reference to FIG. 3 and step 21, from the grey scale frame data F1 and the new grey scale frame data F0. Again, a number of different techniques are known for the calculation of such vectors but in the present embodiment motion is modelled as two dimensional translations of small blocks of pixels.

Once these motion vectors have been calculated they are applied to the initial segmentation S1 by a motion compensation process 102. This provides a first prediction $S0^1$ of the desired segmentation S0 for the frame F0. This prediction $S0^1$ will, however, contain invalid entries for a number of pixels due, in part, to whatever approximations and assumptions were made in the motion detection process, for example the blocking of pixels. Errors may also be introduced by noise, either external or within the image processing system and by "uncovered background" that cannot be predicted. The embodiment therefore identifies pixels for which the segmentation may be invalid (the criteria for invalidity will be described later) and applies various optional processes in stages to such pixels in order to attempt to allocate them to existing regions. Any pixels which are not successfully allocated are then allocated to new regions created by carrying out a segmentation process from scratch on the unallocated pixels.

Two particular categories of pixels have been identified for which the predicted segmentation data will be treated as invalid. In the embodiment, each of these categories is treated by separate processes in the attempt to reallocate pixels to existing regions, although it is equally possible in practice to ignore one or other of the categories, or to combine their treatment in various ways.

The first category of pixels are those which lie on the borders of the predicted regions. Such pixels have been identified by the inventors as particularly susceptible to noise. In addition, because motion vectors are conventionally calculated for a block of pixels rather than individual pixels, errors will tend to be introduced around the borders of regions (objects) where a block contains pixels properly belonging to different objects.

The second category are those pixels which are judged as having failed motion compensation. The motion vectors and pixel data of the image frames are criteria used to determine failure of motion compensation, as will be discussed in fuller detail later.

Process 104 broadly identifies pixels which lie at the borders of the regions to which they are assigned in the predicted segmentation (category 1 pixels). As will be described in more detail below, the embodiment then attempts to reallocate such pixels to more suitable regions according to the pixel values and calculated region statistics.

Process 106 attempts to allocate to suitable regions those pixels for which the motion vector of the block appears not to indicate the motion of the pixel correctly (category 2 pixels), these pixels having been excluded from consideration in process 104. This exploits in particular the inference that for those pixels where the pixel value has not been correctly predicted by the motion vector of the block to which it belongs, then the pixel's region will also not have been correctly predicted in the predicted segmentation.

Those pixels which have failed motion compensation (category 2) but which lie at or near the boundary of one or more existing regions may then be allocated to one of those regions. As described more fully below, this is achieved in the present embodiment by considering the gradient of the pixel values at each such pixel.

It will be appreciated that, although a number of pixels which lay on the borders of regions (category 1) or which had invalid motion vectors (category 2) have been assigned to existing regions, certain pixels nonetheless remain which, on the above criteria, cannot be allocated to any existing region. This will commonly arise in relation to revealed objects and background. These pixels are thus, themselves, subjected to a fresh segmentation process to create new regions.

After segmentation, it is preferable to eliminate small regions. Such elimination is conducted by merging each small region with its most suitable neighbour and this may allow a significant reduction in the quantity of processing that needs to be conducted subsequently. Further it provides a mechanism for regulating the number of different regions defined by the segmentation which may, otherwise, become excessive. In the present embodiment, the new regions are merged with one another as appropriate, prior to merging with the existing regions but clearly this is not essential.

As indicated by the broken line in FIG. 1, for each subsequent frame of the motion sequence, the new segmentation S0 is taken as the initial segmentation (S1) and the process is repeated.

Figure 2A:
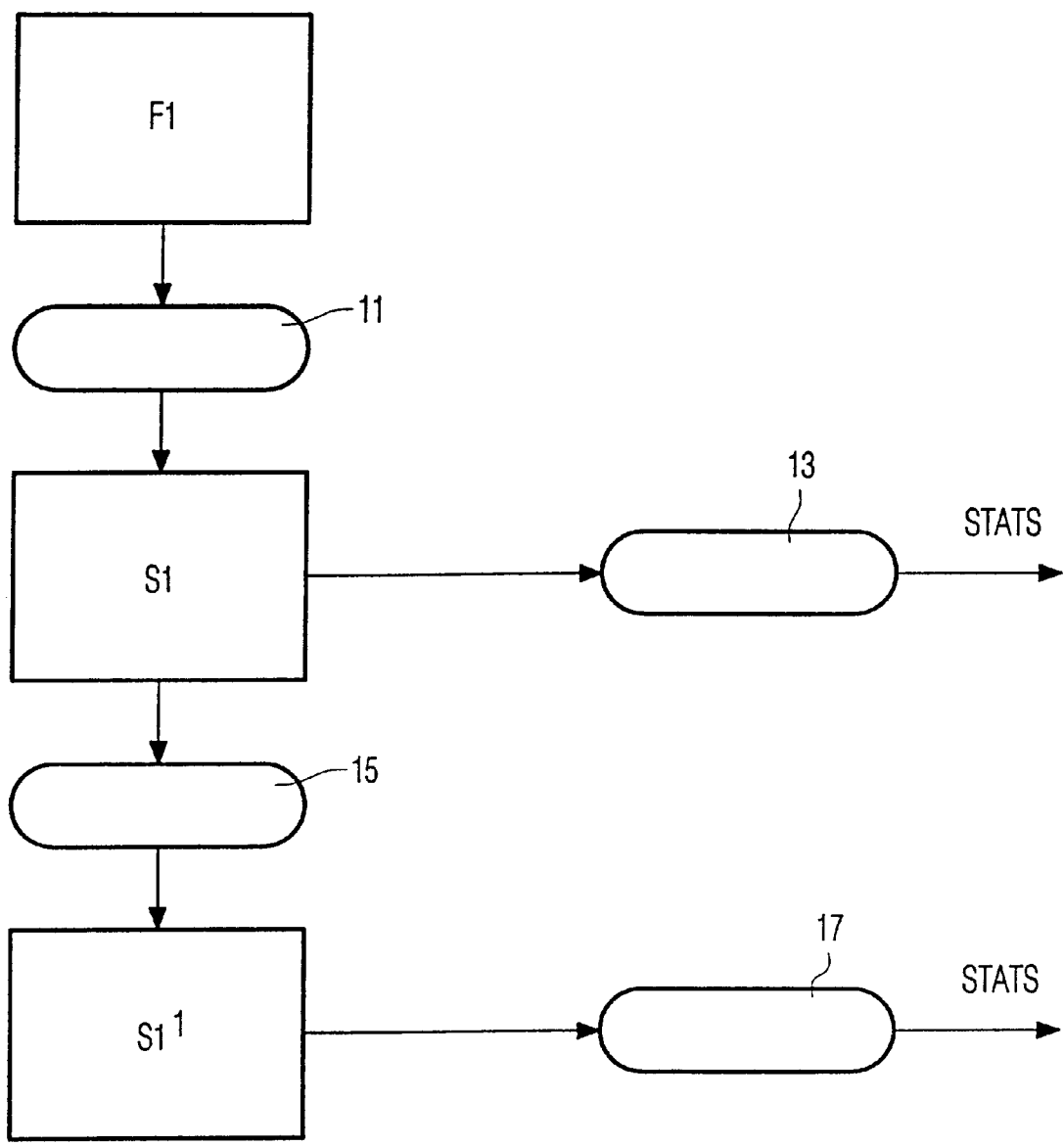
FIGS. 2A, 2B and 2C are more detailed block diagrams showing temporally consistent image segmentation in the embodiment.
Figure 2B:
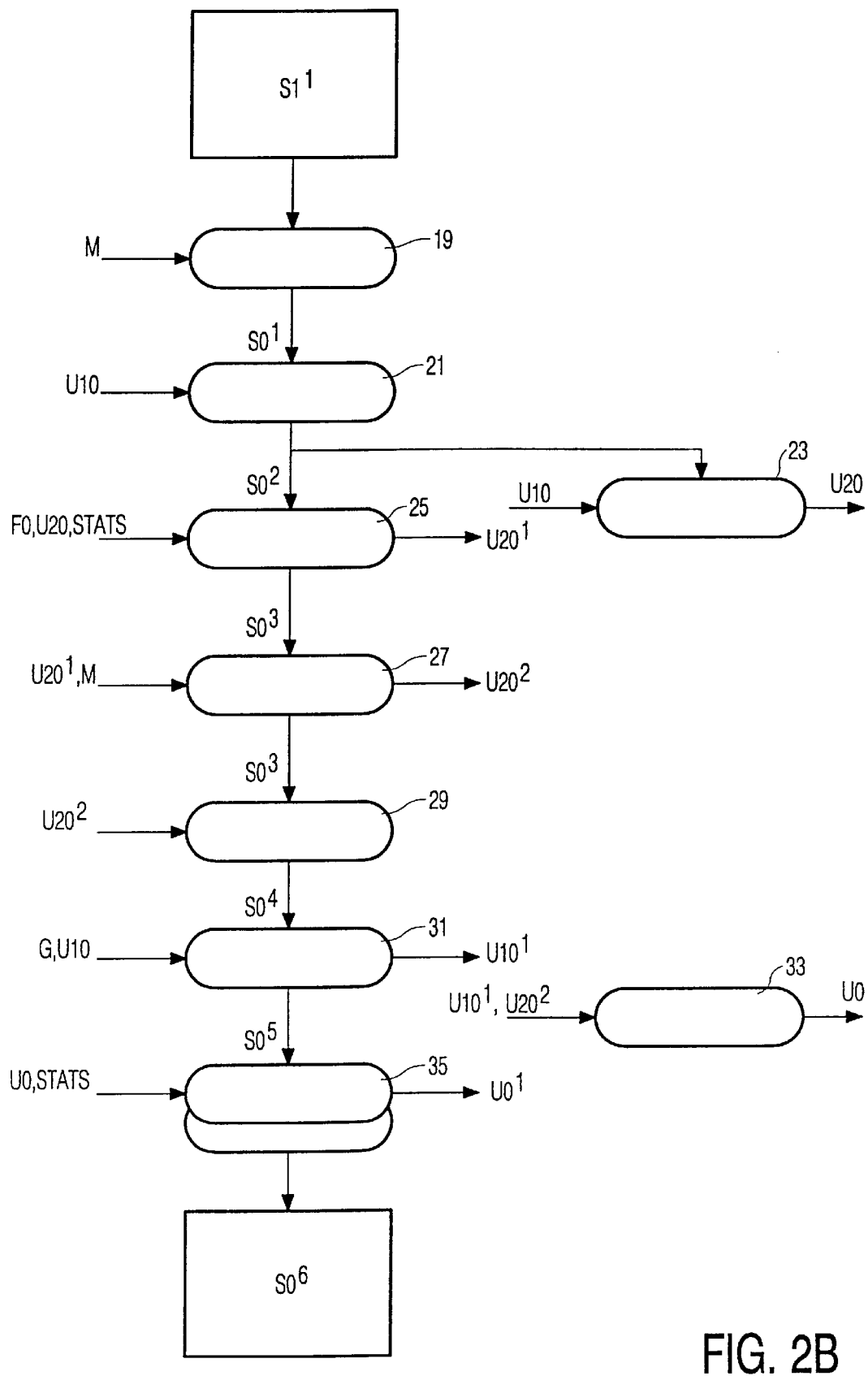
Figure 2C:
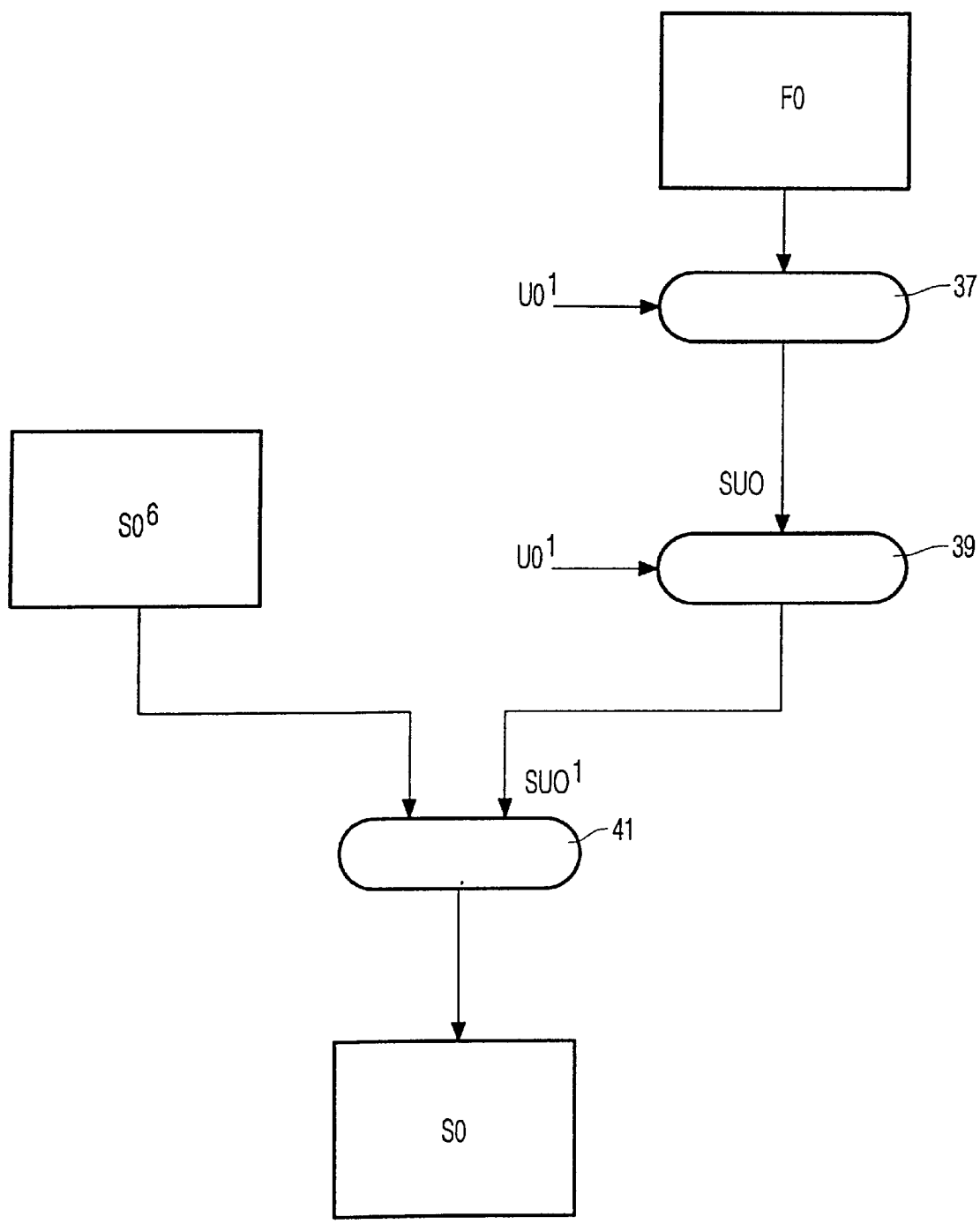

FIGS. 2A, 2B and 2C show in more detail the image segmentation in the embodiment.

Referring to FIG. 2A, grey scale data for frame F1 is subjected to initial segmentation process 11 in any suitable manner, depending on the image content and the purpose of segmentation. An example of such segmentation will be referred to as the Brice-Fennema technique, and is described in "Scene analysis using regions" (Artificial Intelligence 1 (1970) 205–226). In the embodiment, a pixel array is created and a value is entered for each pixel to identify the region of which it is a member. This representation of the segmentation is used in preference to the chain of "boundary segments" described in the above mentioned paper, as it simplifies the succeeding steps of the present embodiment. However, such a representation is not essential and the chain representation could instead be used. In particular, it may be expected that the chain representation is used during the initial segmentation and converted to the pixel array form for updating the segmentation from frame to frame. In any case, the result of segmentation process 11 is segment data S1.

In process 13, various region statistics (STATS) are calculated for each region of S1. In the embodiment, the statistics calculated are the number of pixels in each region, the mean grey scale value of each region and the standard deviation of each region. Instead of the mean and standard deviation being stored explicitly for each region, the sum and the sum of the squares of the pixel grey scale values are stored. It will be appreciated that this simplifies the subsequent calculation of the standard deviation when pixels join or leave the region and the standard deviation can be easily calculated using the relationship:

$$\sigma^2 = \frac{\sum (x^2)}{n} - \mu^2 = \frac{\sum (x^2)}{n} - \left(\frac{\sum x}{2}\right)^2$$

where σ is the standard deviation, values of x are the individual grey scale values of the pixels which are members of the region, n is the number of pixels in the region and µ is the mean grey scale value of the region.

Small regions are next "eliminated" in step 15. In the embodiment, those regions smaller than 5 pixels in size are removed although this is an empirically determined value and should not be construed as limiting. In practice, this typically leaves 1000 regions in the frame for an image of 360 by 280 pixels. Eliminating small regions reduces the subsequent processing for the present frame, and also counteracts the tendency for the number of regions to grow during the sequence of images. The elimination could, alternatively, be performed at a later stage in the method but its performance at this stage is preferable as it eliminates the subsequent processing of small regions which may not prove of any significance. Alternatively, by careful choice of the segmentation process and the criteria applied in such a process it may be possible to avoid any small regions being created.

The process of elimination is implemented by merging each small region with the neighbouring region that has a mean grey scale value closest to that of the region to be removed. The segmentation array S1 becomes overwritten with the new region structure $S1^1$.

Additionally, the statistical record STATS for each region is updated in step 17. In the present embodiment, the statistical records are merely updated by considering which pixels have been removed or been joined to each region. It will be appreciated that in practice this step can be integrated with the elimination of small regions (step 15). It will also be appreciated that it is possible completely to recalculate the statistics for each region after the elimination step 15 is complete. This may, for example, be preferable when the statistics are calculated in hardware. As a further alternative, because the neighbouring region will typically be much larger than the eliminated small region, the statistics of the neighbouring region can be used without any alteration as a reasonable approximation for the new region statistics. In other words, step 17 is optional.

FIGS. 2B and 2C illustrate the various processes carried out on segmented frame $S1^1$ after the initial segmentation $S1^1$ is established to provide output segment data S0 for the current frame F0, as will now be described.

In step 19, the motion vectors M are used to motion compensate the segment data S1 for frame F1, on a pixel by pixel basis in order to give a first prediction of segment data for frame F0. This prediction is designated $S0^1$. Different methods of motion compensation are known in the art. In the present embodiment, it is assumed that the motion vectors M are provided one for each block of the current frame F0, and will indicate the relative location of pixels in a segmentation data S1 whose region ID can be copied to the pixels of the block presently under consideration in array $S0^1$, even if the block matching performed by the motion estimator yields a very poor match. Other embodiments are possible in which certain blocks are flagged by the motion estimator as having failed motion detection, and the skilled person will readily appreciate that the present embodiment can be adapted to allow for this. Similarly, the present method can be adapted appropriately where "forward" motion vectors are available (one per block of the previous frame), instead of the "backward" motion vectors available in the present embodiment, or where the motion estimation information takes an entirely different form.

It should be noted that although the values of STATS could be updated at this stage to refer to the predicted segmentation $S0^1$, this is not in fact done. Although the statistics are produced from the previous segmentation data, they are, within reasonable errors, applicable to the current segmentation data.

Step 21 clears the individual pixels of $S0^1$ which are flagged as invalid by a first array of flags U10.

Figure 3:
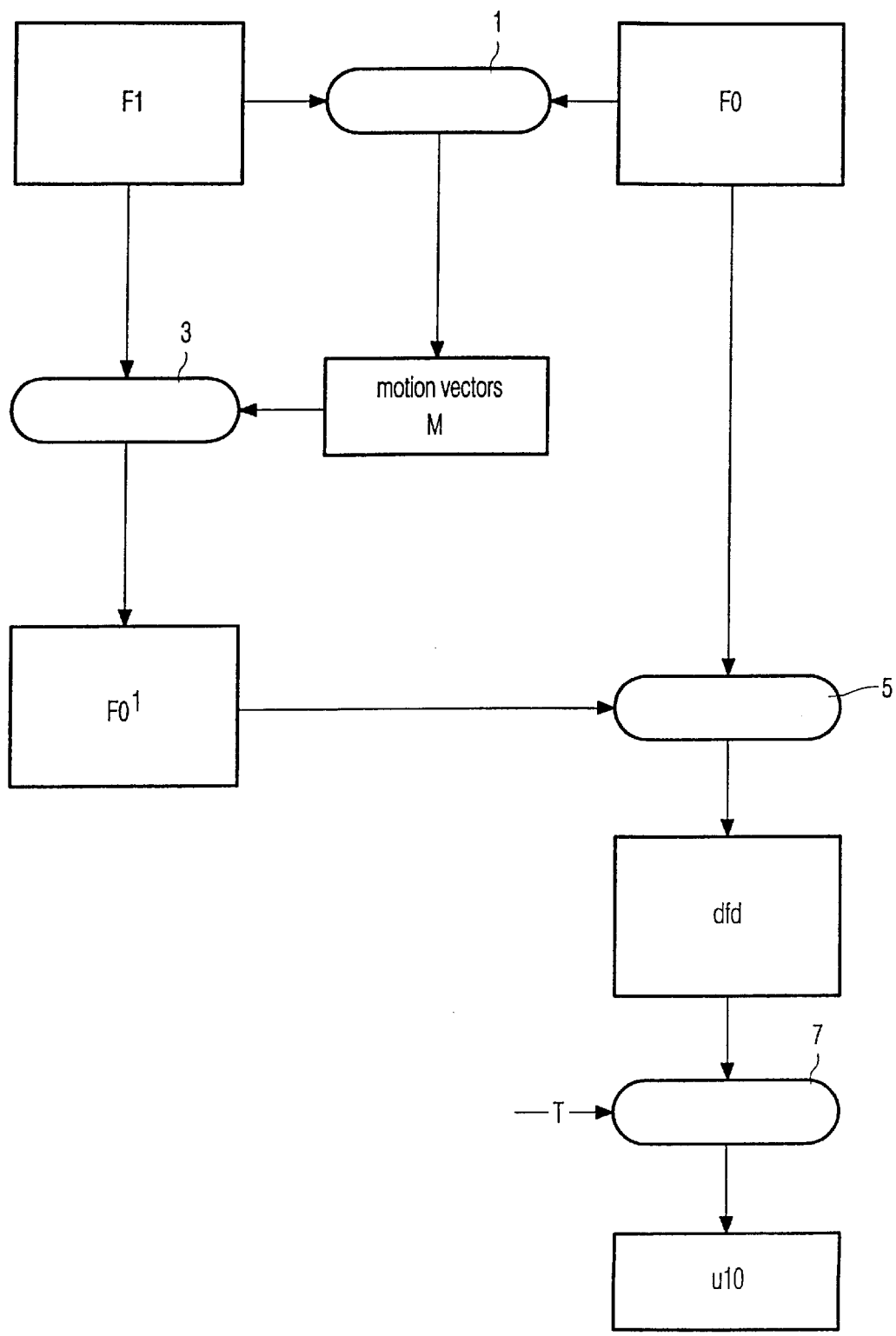
FIG. 3 is a block diagram illustrating the method of calculation of motion vectors and the detection of pixels where motion estimation has failed.

FIG. 3 shows the determination of the flags U10 which are related to the displaced frame difference (DFD) of each pixel. Data F1 and F0 is input into motion detector 1 in order to calculate motion vectors M. Examples of motion detectors are well known in the art, being conventionally used in image coding for high definition TV, and for lower bit rate image coding schemes such as the well known MPEG and H.261 standards. Examples of such motion detectors are described in "Motion Estimation and Compensation" by Gerard de Haan (1992), ISBN 90-74445-01-2 and "Advances in Picture Coding" by Hans Musmann, Peter Pirsch and Hans Joachim Grallert (Proceedings of the IEEE, Vol 73, No. 4, April 1995).

The motion detector used in the present embodiment operates only in respect of two-dimensional planar movement and calculates the translation of blocks of 8×8 pixels in the x and y directions. However, it will be apparent to a person skilled in the art that a more complex motion detector could be employed capable of modelling transformations more complex than simple translation and that the blocks could be of various sizes or even a single pixel. A further alternative is the calculation of motion vectors by regions.

The simple method of calculating such motion vectors adopted in the present embodiment is to consider each block of pixels in the current image frame F0 in turn, searching through previous frame F1, to find a block of pixels which best matches i.e. to see where the present block of pixels is most likely to have come from. Searching in frame F1 is conducted typically in an outward spiral from the block's location in F0. Such backward motion vector calculation has the advantage over the alternative of forward motion vector calculation that a vector is produced for each and every block of F0. However, forwards motion vectors could be used, in particular where these are available already in the apparatus. The lack of a motion vector for certain pixels in F0 is not fatal as the embodiment could be adapted to set flag U10 (motion vector invalid) directly for such pixels.

As described above, the motion detector 1 will provide a motion vector for each block of pixels in F0. Frame F1 is then subjected to a process of motion compensation 3 using the derived motion vectors M. In other words the motion vectors are applied to the frame F1 to give a prediction of the frame F0. This prediction is designated F0$^1$. Although each pixel does not have its own exclusive motion vector it will be apparent that the motion vector for the block containing that pixel will be used. Motion compensation processes are again well known in the field and need only be matched to the type of motion detection process used and the consequent form and meaning of the motion vectors available. The segmentation prediction S0$^1$ is produced (step 19) from the segmentation S1 using the same motion vectors in the same manner.

F0 and F0' are then subjected to pixel difference calculating step 5 which detects, for corresponding pixels, the difference in the grey scale values of each pixel between the two arrays i.e. the difference between the pixel's actual value and its predicted value. In the present embodiment each pixel is considered in turn and the pixel difference calculation provides an absolute value (magnitude) of pixel difference. A pixel array of displaced frame difference (DFD) is thus produced, designated DFD in the figure. In practice, the DFD values may be available already as a by-product of the block matching process in step 1, depending on the implementation.

At step 7 the value of DFD is tested for each pixel to determine whether it exceeds a threshold T. The data provided by the thresholding is stored in flag array designated U10 in the figure, and is indicative of whether the motion vector for the block containing the pixel has failed to predict the value of that individual pixel. In the present embodiment, a fixed threshold is used for all the values of DFD, but this is not essential and instead the value of the threshold could be varied. For example, in an adaption of the method, processing could be carried out to detect objects (such as foreground and background) and different thresholds applied to these different objects.

In alternative embodiments, it is possible to set a flag as part of the motion vector calculation step 1 to indicate that such a good match for the block has been found, that the motion vector will be valid and thus for that block of pixels it is unnecessary to calculate the DFD. Conversely, it would also be possible to set a flag such as the U10 flag directly during motion vector calculation to indicate that such a bad match had been made that the motion vector is almost certainly invalid. Such variations although necessitating an increase in complexity may reduce subsequent processing time, particularly in a software-based implementation.

Returning to FIG. 2B, step 21 clears the pixels flagged by U10 in the predicted segmentation S0$^1$ step. This is achieved by setting a "null" region ID in the array S0 for each pixel to be cleared. This step realises the inference mentioned in the introduction, namely that, if a pixel's value has been poorly predicted, then its predicted region ID is probably wrong too. The output from this process is designated segmentation S0$^2$.

At this point, it is convenient also to use the S0$^2$ data and the flags U10 to produce a second flag array identifying the region borders mentioned above with reference to step 104 of FIG. 1. This second flag array is labelled U20 and is calculated in step 23. The flags U20 indicate which of those pixels contain region IDs that are nominally valid (i.e. U10 is not set) but which are poorly connected to their regions. The criterion imposed to judge such poorly connected pixels is whether a pixel is fully 8-way connected to pixels belonging to the same region. A fully 8-way connected pixel has two horizontal, two vertical and four diagonal neighbours, all with the same region ID (as stored in S0$^2$). If the pixel is not fully 8-way connected, to some extent the pixel lies on the border of a region. The pixel array of flags U20 is thus created.

Pixels on borders are then assigned to a suitable region if possible by border assignment step 25. This process uses the U20 flag in addition to the previously created statistical data STATS (see step 17, FIG. 2A) and F0 data. Certain artifacts are commonly created at region boundaries by noise within the system, and also "external" noise within the source images. For example, adverse effects are often apparent when an object which is illuminated by a 50 Hz source is viewed by a 60 Hz camera. Step 25 assists in the elimination of these artifacts by reassigning the pixels at region boundaries to the most appropriate regions, which are not necessarily the regions to which they were previously assigned.

To determine whether any neighbouring region is (more) suitable for the pixel of interest, step 25 compares the grey scale of the pixel (x), the mean grey scale of the region ($\mu$) and the standard deviation of the region ($\sigma$). A neighbouring region is judged suitable to have the pixel of interest assigned to it if the following inequality is satisfied:

$$|x-\mu|<1.5\sigma$$

If more than one neighbouring region qualifies, then the pixel is assigned to whichever region minimises the deviation from the mean. For each pixel that is successfully assigned to a neighbouring region, the appropriate region ID is entered into the segmentation, overwriting the array S0$^2$ and the U20 flag is cleared. For clarity, the updated segmentation will be referred to as S0³ and the updated U20 flag array will be referred to as U20¹.

It will be appreciated that certain of the U20¹ flagged pixels will, in fact, be of zero motion vector. Step 27 "confirms" such pixels as allocated to the same region that to which it was allocated in the predicted segmentation.

As the predicted region ID will still be stored in segmentation array S0³, in effect no operation is carried out upon this data. However, flag U20¹ is cleared (step 29) for those pixels which have successfully been allocated (confirmed) and the updated flag array is hereinafter termed U20².

In a similar manner to clearing step 21, those pixels which are still flagged by U20² are now cleared by insertion of the null region ID in the segmentation array S0³. The updated segmentation is designated S0⁴ in FIG. 2B.

Step 31 then attempts to allocate pixels which have failed motion compensation (those flagged in array U10) by considering whether the pixels lie on an edge feature in the image and can be allocated to an appropriate neighbouring region. The most appropriate region is determined by consideration of the grey scale gradient at the pixel as follows.

Figures 4A, 4B:
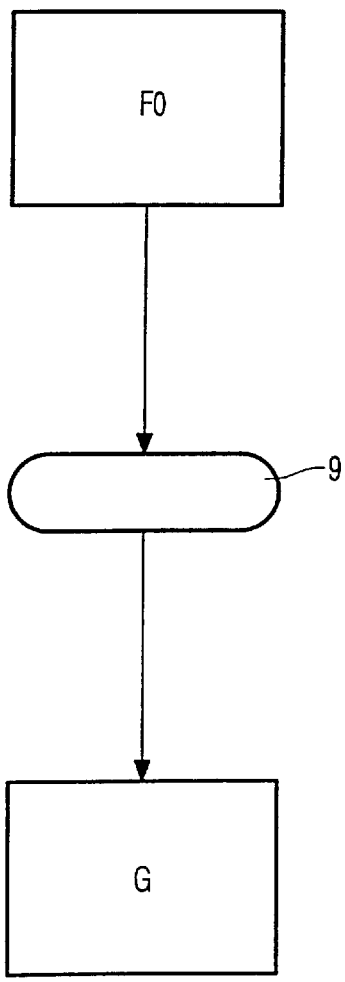
FIGS. 4A and 4B illustrate the calculation of the gradient at each pixel in an embodiment of the present invention.

FIGS. 4A and 4B illustrate the gradient calculation step 9 in the present embodiment. The gradient calculation used is well known and involves the application of two masks each 3×3 pixels in size through the array F0 to give a pixel array of gradients G, each comprising an x component $G_x$ and a y component $G_y$. These masks are known as "Sobel operators" and are shown in FIG. 4B. These operators $G_x$ and $G_y$ provide a value representative of the grey scale gradient at the pixel corresponding to the central point of the mask. It will be appreciated that an alternative gradient calculation could, instead, be used. It will further be appreciated that although this process of gradient calculation is described at this point as being performed across the entire image frame F0, it may need only to be performed in respect of those pixels which will be subjected to a process using the gradient calculation. Again the resultant increase in complexity must be balanced with the possible decrease in processing time and storage requirements, according to the detail of the implementation.

Figure 5:
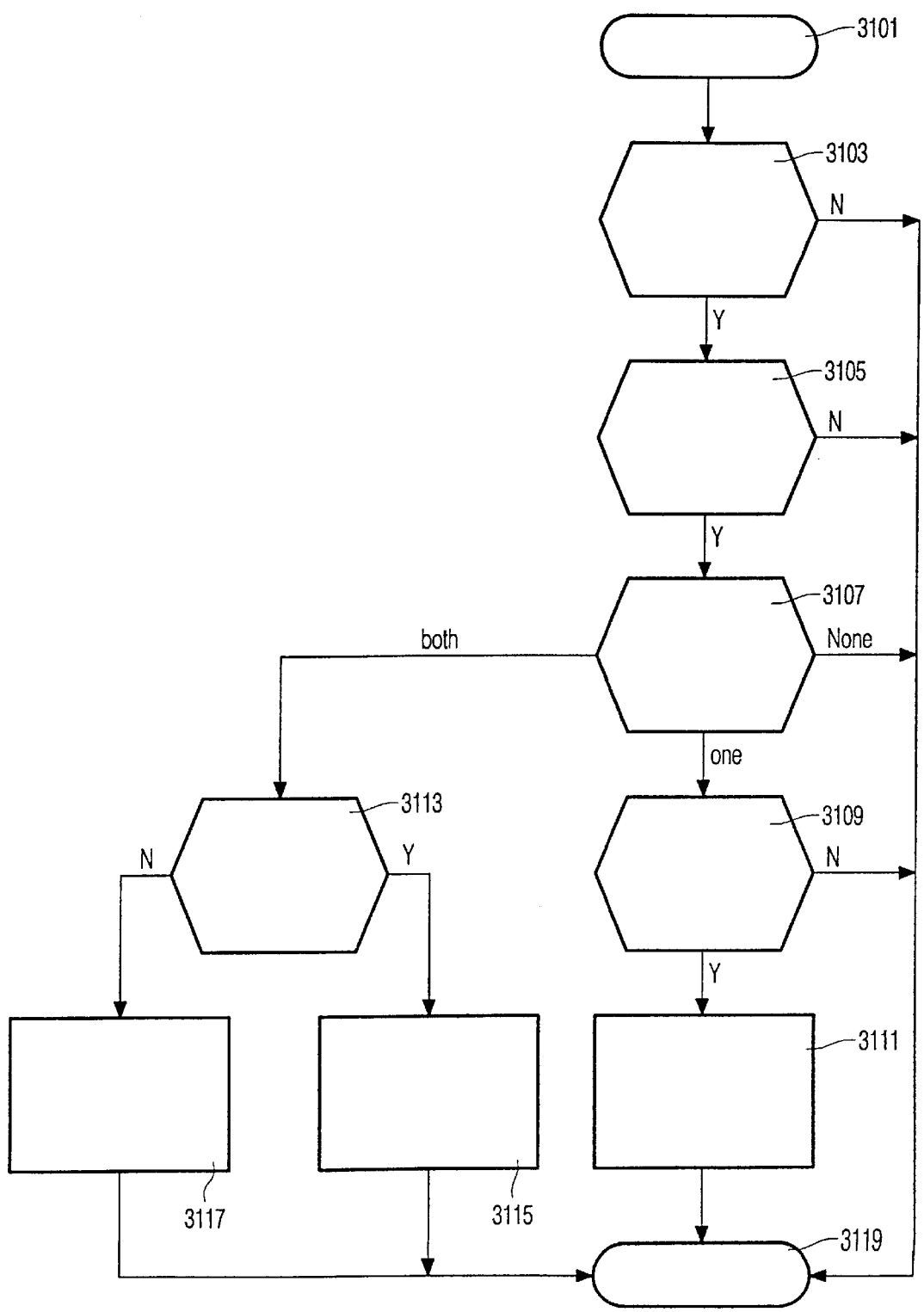
FIG. 5 is a flow diagram illustrating the process of edge pixel allocation in the embodiment.

The allocation step 31 using gradients G will now be described in greater detail with reference to FIG. 5. Steps 3101 to 3119 of that figure are performed for each pixel.

In step 3103 it is considered whether the pixel has been flagged by flag U10. Only U10 flagged pixels are considered in step 31. In step 3105, it is considered whether the magnitude of the gradient of the pixel in question exceeds a threshold. Where the range of possible grey scale values is 0 to 255, a threshold of 15 has been determined empirically by the inventors as providing a suitable indication of whether an edge feature is present (a line of contrast between two colours). It will be apparent that, if a different range of grey scales is used or if a colour image is processed then the calculation and/or the threshold magnitude of the gradient would be adjusted accordingly. Where the magnitude does not exceed 15, the pixel is not considered further in FIG. 5 and the process moves to the next pixel.

In step 3107 it is considered whether one or both of the adjacent pixels in the direction of the identified edge are allocated to a region. If neither pixel is allocated then the process moves to the next pixel.

If one (but not both) of the adjacent pixels is allocated to a region it is considered, at step 3109, whether the magnitude of the gradient at the current pixel is greater than the magnitude of the gradient at the adjacent pixel which is already allocated to a region. If such a relationship exists then the pixel is allocated to the same region as that of the adjacent pixel (step 3111) and the process moves to the next pixel. If the test at 3111 is not satisfied, the process moves to the next pixel without assigning the pixel to the region.

Alternatively, at step 3107 it may be determined that both adjoining pixels are already allocated to regions. In this case the process branches to step 3113.

In this step 3113, it is considered whether the magnitude of the gradient of one (but not both) of the adjacent pixels is less than the magnitude of the gradient of the current pixel (similar test to step 3109). If one adjacent pixel does not satisfy this relationship, then the other adjacent pixel which does have a lower gradient has its region ID copied to the current pixel in step 3115. In other words, the edge is apparently getting steeper in the direction of the higher gradient and hence the pixel is more likely to belong to the region of the pixel with the lower gradient.

Alternatively, at step 3113 it may be determined that either both of the neighbouring pixels or neither of the neighbouring pixels have a lower gradient. In these cases, step 3117 allocates the pixel to the same region as that of the neighbouring pixel with the lower gradient. In the case where both neighbouring pixels have a higher gradient, the edge is apparently getting steeper in both directions, however, it is less steep in the direction of the neighbouring pixel with the lower gradient and so the pixel of interest belongs to the region allocated to that pixel. In the case where both neighbouring pixels have a lower gradient, the pixel lies on an edge and therefore, to some extent, the region to which it is allocated is arbitrary. However, the pixel with the lower gradient is likely to be further from the notional edge and so the pixel of interest is allocated to the same region as that pixel.

Figure 6A:
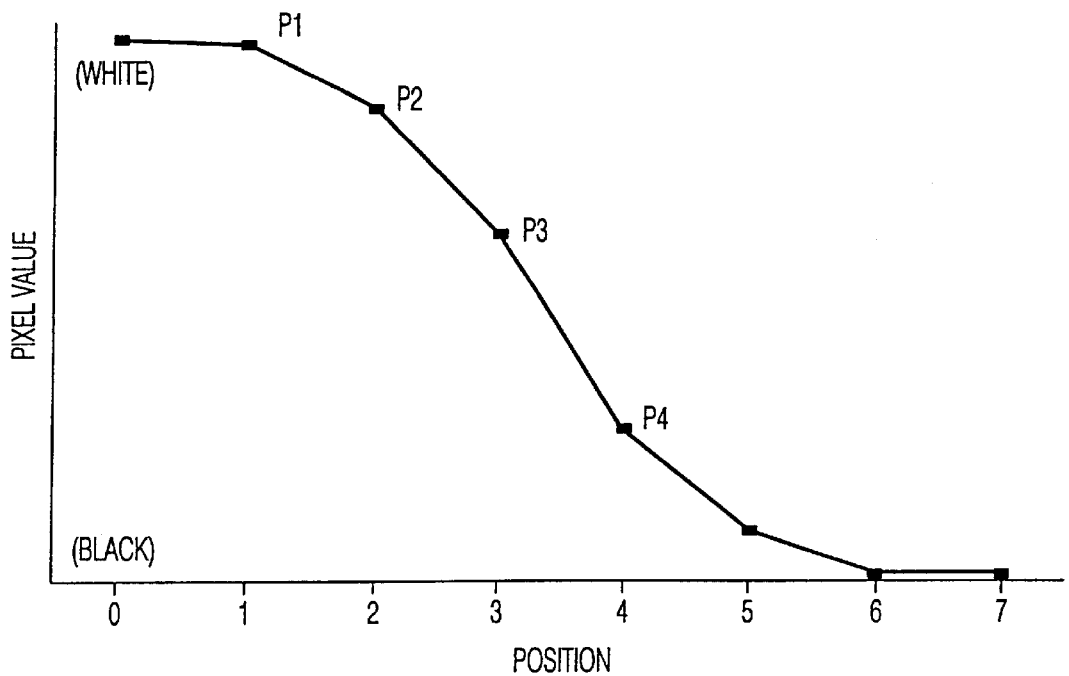
FIGS. 6A and 6B are diagrams illustrating pixel intensity and gradient to assist in the description of the process shown in FIG. 5.
Figure 6B:
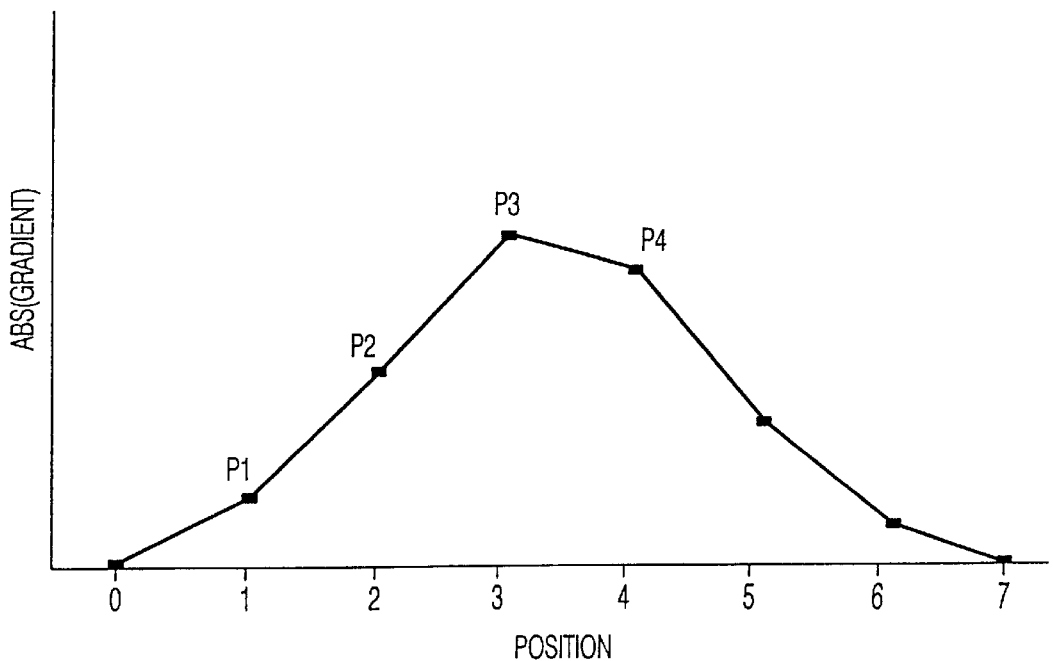

The practical effect of the above described allocation technique will now be explained with reference to FIG. 6. FIG. 6A is a graph of grey scale values around a typical edge feature between white pixels on the left side of the graph and black pixels on the right side of the graph. FIG. 6B represents the gradient of the edge depicted in FIG. 6A. Clearly, a notional boundary between regions is aligned with the peak of the gradient curve. The positions of four neighbouring pixels are labelled P1, P2, P3 and P4.

A first case will be illustrated where the pixel of interest is P2. For this illustration it will be assumed that neighbouring pixel P1 has been allocated to a particular region, but P3 has not (region ID=null). As can be seen in FIG. 6B, the gradient at P2 is greater than that at P1. In this case the allocation process will be conducting the test depicted at step 3109 of FIG. 5. This test will be satisfied and P2 will thus be allocated to the same region as P1. However, if a second case is considered where P3 is allocated to a region but P1 is not, P2 will not be allocated to the same region as P3 because P3 has a gradient greater than at P2. Because the gradient is greater at P3 than P2, it is assumed that P2 is not on the same side of the peak as P3, and is hence on the other side of the notional boundary between regions.

Considering now the situation where a pixel's neighbouring pixels are both allocated to different regions. The same pixel P2 will be considered but in a case where P1 and P3 are allocated to different regions. The allocation process will be conducting the test at step 3113 (FIG. 5) and will allocate pixel P2 to the same region as P1 (step 3115), which is more likely to be on the same side of the notional boundary.

Further, in the situation where P3 is the unassigned pixel of interest and P2 and P4 are assigned, P3 is assigned to the same region as that of P2 (step 3115) as this is more likely on the same side of the edge.

It should be noted that the above described allocation process is used in the embodiment for simplicity and one skilled in the art will realise that a more complex process (for example employing curve fitting over several pixels) could be used. As has previously been explained the process of FIG. 5 is repeated for each pixel. It should be noted that when this process has been successful in allocating a pixel to a region it clears the U10 flag so as to indicate this (not shown in FIG. 5). The modified flag array is termed $U10^1$. The modified segmentation after step 31 is designated $S0^5$ in FIG. 2B.

The step 31 is considered optional, but can be effective to compensate for slight shifts in edge features that will produce large DFD values, and thereby to reduce further the number of unallocated pixels to be processed at subsequent stages, by means of simple heuristic tests. These particular heuristics are of course only examples of the criteria that may be employed in the detection and allocation of pixels near edge features. The step could in principle be iterated more than once, to allocate further pixels as the regions "grow" to absorb the edge features.

Returning to FIG. 2B, in step 33 the two flag arrays $U10^1$ and $U20^2$ are combined into a single flag array U0 which flags those pixels which still have not been satisfactorily allocated to a region. Such combination can be achieved by a simple logical OR, and the storage space for either U10 or U20 can be overwritten with the new array U0.

In allocation step 35 the connectivity of U0 flagged (unallocated) pixels to other unallocated pixels is considered. Those pixels which have low 8-way connectivity are allocated to adjacent regions as follows.

Each pixel flagged by U0 is checked to see whether its 8-way connectivity to other U0 flagged pixels is greater than 2. If not, then the pixel is allocated to whichever of the neighbouring regions has a mean grey scale closest to that of the pixel according to the stored region statistics. The U0 flag is thereafter cleared for this pixel. The updated flag is referred to as $U0^1$. The justification is that poorly connected pixels, isolated from other unallocated regions, are unlikely to form by themselves regions of any great interest. In the present embodiment, step 35 therefore helps to inhibit the generation of small regions, which would only be eliminated at a later stage. Step 35 also eliminates certain long thin strings of unallocated pixels that can arise along region boundaries. Step 35 is also considered optional, and the heuristics applied can be varied. In particular, values other than 2 could be used for the connectivity threshold. A value of 3 will have a stronger effect on elongate regions, a value of 1 will tend to eliminate only very isolated pixels.

The above step 35 is iterated twice in the present embodiment, as the first pass may result in new poorly connected pixels. The updated segmentation after the second iteration is designated $S0^6$.

At this stage, those pixels which have still not successfully been allocated to one of the existing regions are now themselves subjected to a segmentation process in step 37 (FIG. 2C) to create new regions. In the present embodiment, the same segmentation process is used to provide segmentation data SU0 for the new regions of previously unallocated pixels as that used in the initial segmentation of the F1 image (step 11) but this need not necessarily be the case.

These new regions are merged together, if possible, in step 39, again using merging criteria such as those outlined in the Brice-Fennema paper referred to above. This process allows removal of a number of unnecessary regions. The merged segmentation is designated $SU0^1$.

In step 41, the newly created regions of $SU0^1$ are merged with the existing regions of $S0^6$. The merging criteria may be the same as the earlier merging step 39 or different. In the embodiment the same merging criteria are used. Again merging reduces the number of unnecessary regions by combining adjacent regions of similar grey scale statistics.

After the merging step 41 the final segmentation for frame F0 has been obtained, designated S0. S0 is then used in the image coding or other processing as appropriate to the application. As indicated by the broken line in FIG. 1, the updated segmentation S0 is then used as the initial segmentation for a next frame, and the whole process of FIGS. 2A–2C is repeated as necessary to obtain a temporally consistent segmentation throughout the motion picture sequence.

Figure 7:
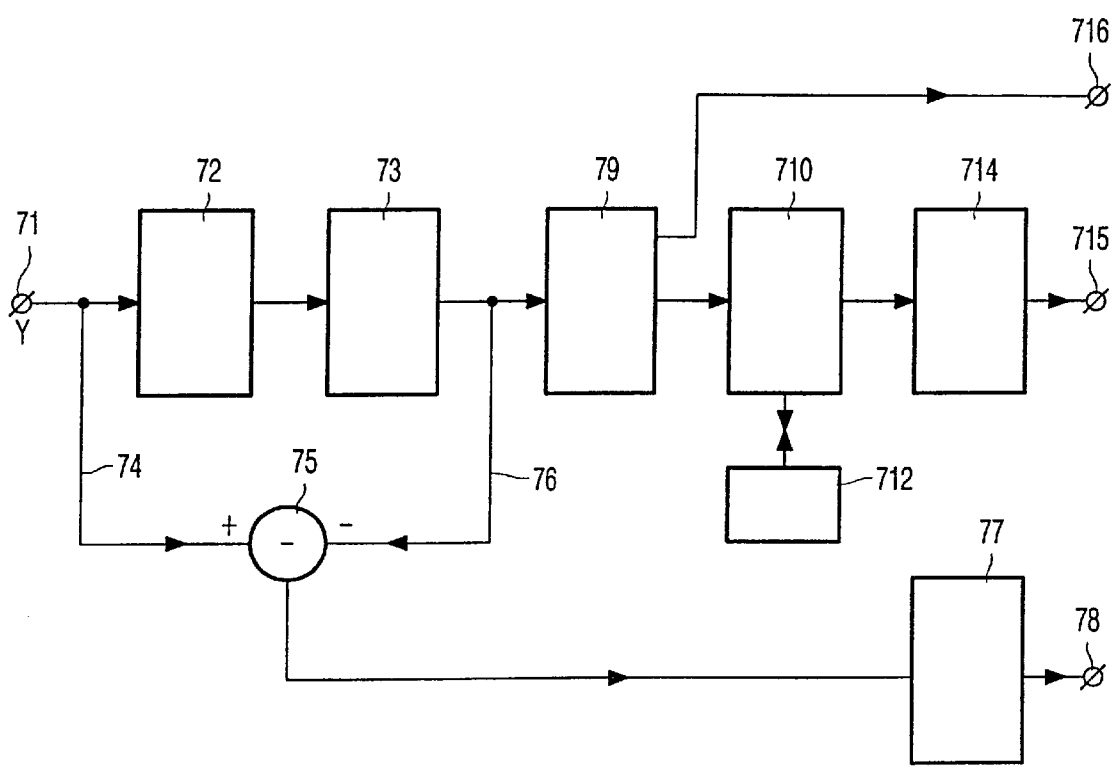
FIG. 7 is a block diagram of an image encoding apparatus employing the image segmentation process of FIGS. 1 to 6.

FIG. 7 shows an image encoding apparatus incorporating the temporally consistent segmentation process described above. The encoder employs region and texture encoding, more details of which can be found in EP-A-0454234, mentioned above. A brief description only will be given here.

A luminance picture signal Y is applied to a segmentation device 72, which implements the process described above, and a modal filter 73 uses the segmentation to produce a region signal. Both the picture signal and the region signal are applied to a subtractor circuit 75 to produce a texture signal which is encoded in encoder 77. The region signal is applied to an edge mapping device 79 to produce a region list signal and an edge map of the original image. The edge map is subjected in an element prediction device 710 to a template to produce a prediction from a look-up table in a memory 712 regarding the value of an element in a fixed position adjacent the template. If the prediction is correct then a prediction error signal indicates no error while if an error exists either the prediction error signal conveys the actual value or where it may be found in a look-up table. The prediction error signal is encoded in a second encoder 714. The region list signal at 716, the texture signal at 78 and the error signal at 715 can be transmitted at low bandwidth to a decoder which reconstructs approximately the original image.

When a sequence of image frames are fed to the encoder of FIG. 7 for transmission of a motion picture, the segmentation device 72 supplies the modal filter 73 with a segmentation which is temporally consistent from frame to frame. Motion information is not used to compress the region signal or the texture signal in the present example. Nevertheless, an improved subjective image quality is obtained when the motion picture sequence is decoded from the region and texture information, for a given bandwidth, due to the temporal consistency which has been imposed on the segmentation.

As will be apparent to a person skilled in the art, the above processes could be embodied in software, hardware or a combination of the two, although the embodiment described above was in practice implemented in software, not least for the purposes of experimentation.

As already suggested at various points above, the skilled person will appreciate that many routine variations in the detail of implementation are possible, and indeed desirable, dependent on the application and the hardware resources available. The pixel-level arrays of flags (U10, U20), region IDs (S1, S0), DFD and gradient values (G) clearly impose a storage burden that can be reduced by processing the pixels completely in one part of the image before moving onto the next. The complexity of managing the various processes of course becomes greater. The values of G in particular do not have to be generated for every pixel, and even DFD calculations can be limited to particular pixels, pixel blocks or other groups of pixels, if the saving in computation is significant. On the other hand, the inventors have found that in an experimental system, having the full set of arrays of variables and flags allows the workings of the various processes to be displayed very effectively for a range of source materials. These displays of course, will assist in fine tuning of thresholds and other parameters, and in identifying which parts of the process might be eliminated in a particular application with least loss of quality. In particular, any of the steps 23 to 35 can be omitted with modest loss of quality.

Likewise, it will be appreciated that the range of possible uses of the segmentation in image processing is not at all limited to the examples detailed above. In image coding, the segmentation may be explicitly coded, as in Region and Texture Coding, or it may be used as a "hint" for the coding of pixel data, particularly in schemes such as H.261 and MPEG with a variable bit rate per pixel or per block. The tracking of specific objects or classes of image features can also be assisted, for image enhancement or processing generally. For example, it may be desired automatically to increase contrast in regions of a specific colour in microscopic or radiographic motion sequences, or to perform some further processing automatically only on such regions. Further diverse applications including machine vision, and digital film and video special effects such as colourisation will be apparent to the skilled reader.

The processes described can be extended readily to cope with multi-colour images, in a variety of ways. Particularly in the case of colour images, the pixel values processed by the segmentation routine may be pre-processed to enhance certain attributes. For example a particular colour mapping might produce a modified "grey scale" image wherein skin tones are highlighted, and this can be used instead of the original colour values at one or more stages of the process. Such techniques are generally peripheral to the inventive concepts disclosed herein, but can be effective in extending greatly the quality and utility of the segmentation results.

Also, the present processes need not be applied to every successive frame in the source motion picture sequence. For example, in the well-known MPEG system, intraframe coding, interframe prediction and bidirectional prediction are applied to different subsets of the source frames (I pictures, P pictures and B pictures). Similarly, the temporally consistent updating of segmentation need not be applied to every frame, and/or can be applied differently to different subsets of frames.

It will be apparent to those skilled in the art that the invention may be embodied in a computer such as an IBM compatible personal computer (PC) or the like. In such an embodiment, the computer will typically comprise fixed and removal storage media such as hard and floppy disc drives, or a CD-ROM. Furthermore, the sequence of instructions necessary for causing the computer to function in accordance with the invention may be stored on the fixed or removable storage media, for subsequent reading into the internal memory for controlling the central processing unit of the computer. The program instructions may alternatively be delivered by communication signals from a remote storage device.

From reading the present disclosure, other modifications will be apparent to persons skilled in the art. Such modifications may involve other features which are already known in the design, manufacture and use of object tracking systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of operating an image processing apparatus to produce for a sequence of related image frames, a consistent segmentation into regions, the method comprising for each frame of interest the steps of:
    (a) receiving current frame pixel data for the frame of interest, reference frame pixel data and a reference frame segmentation;
    (b) calculating motion estimation information from the current frame pixel data and the reference frame pixel data to represent spatial transformations occurring between said frames;
    (c) using said motion estimation information and the reference frame segmentation data to obtain a predicted current frame segmentation;
    (d) using said motion estimation information and the reference frame pixel data to obtain a predicted current frame pixel data;
    (e) identifying on a pixel by pixel basis incorrectly predicted portions of the predicted current frame segmentation by comparison of the received current frame pixel data and the predicted current frame pixel data; and
    (f) modifying on a pixel by pixel basis the predicted current frame segmentation for the identified portions to obtain the desired consistent segmentation for the current frame.

2. A method according to claim 1 wherein the step (f) includes constructing and inserting into the predicted current frame segmentation a new segmentation of the identified incorrectly predicted portions.

3. A method according to claim 2 wherein step (f) includes preliminary steps to assign portions to the same regions as neighbouring portions not identified in step (e), prior to construction of said new segmentation.

4. A method according to claim 2 wherein said new segmentation is subjected to a merging process to reduce the number of newly created regions prior to insertion in the predicted segmentation.

5. A method according to claim 2, wherein the segmentation is subjected to a merging process after insertion of the new segmentation for the identified portions, so as to reduce the number of regions in the obtained segmentation.

6. A method according to claim 1 wherein step (e) further comprises using the predicted segmentation to designate further portions of the predicted segmentation as incorrectly predicted.

7. A method according to claim 6 wherein said further portions designated as incorrectly predicted are those portions which lie at borders of regions in the predicted segmentation.

8. A method according to claim 1 wherein said modifying step (f) includes a step of assigning incorrectly predicted portions to existing regions dependent upon the assigned regions of neighbouring portions.

9. A method according to claim 8 wherein the step (f) includes assigning at least some of the incorrectly predicted portions to the same regions as correctly predicted neighbouring portions in dependence upon pixel data gradients in the current frame.

10. A method according to claim 9 wherein incorrectly predicted portions having gradients above a threshold are assigned to the same regions as neighbouring portions in dependence upon the assignments and gradients of said neighbouring portions.

11. A method according to claim 8, wherein step (f) includes assigning at least some of the incorrectly predicted portions to the same regions as correctly predicted neighbouring portions in dependence upon statistics of the pixel data for those regions.

12. A method according to claim 1 wherein the current frame and the obtained segmentation are used in steps (a) to (f) as the reference frame and reference frame segmentation to obtain the consistent segmentation for a subsequent frame of interest.

13. A method according to claim 1 wherein the image frame sequence comprises a motion picture.

14. A method according to claim 1 further comprising the step of processing pixel data of the current image frame in accordance with the current frame segmentation obtained in step (f) and outputting a signal conveying the processed pixel data.

15. A method according to claim 14 further comprising the step of directly or indirectly recording said processed image frame on or in a recording medium.

16. A method according to claim 14 wherein said processing step encodes the frame of interest with compression using the obtained segmentation.

17. A method according to claim 16 wherein said encoded frame includes a representation of the obtained segmentation.

18. A method according to claim 16 wherein the obtained segmentation is used to allocate bandwidth differently to different portions of the image.

19. An image processing apparatus for producing for a sequence of related image frames a consistent segmentation into regions, the apparatus comprising:
 (a) a receiver which receives current frame pixel data for a frame of interest, reference frame pixel data and a reference frame segmentation;
 (b) a device which calculates motion estimation information from the current frame pixel data and the reference frame pixel data so as to represent spatial transformations occurring between said frames;
 (c) a device which obtains predicted current frame segmentation using said motion estimation information and the reference frame segmentation data;
 (d) a device which obtains predicted current frame pixel data using said motion estimation information and the reference frame pixel data;
 (e) a device which identifies on a pixel by pixel basis incorrectly predicted portions of the predicted current frame segmentation by comparison of the received current frame pixel data and the predicted current frame pixel data; and
 (f) a device which modifies on a pixel by pixel basis the predicted current frame segmentation for the identified portions to obtain the desired consistent segmentation for the current frame.

20. An apparatus according to claim 19 wherein the modifying device (f) includes a device which constructs and inserts into the predicted current frame segmentation a new segmentation of the identified incorrectly predicted portions.

21. An apparatus according to claim 20 wherein the modifying device (f) includes a device which preliminarily assigns portions to the same regions as neighbouring portions not identified by the identifying device (e), prior to construction of said new segmentation.

22. An apparatus according to claim 20 further comprising a device which merges regions of said new segmentation to reduce the number of newly created regions prior to insertion in the preferred segmentation.

23. An apparatus according to claim 20 further comprising a device which merges regions of the segmentation after insertion of the new segmentation for the identified portions, so as to reduce the number of regions in the obtained segmentation.

24. An apparatus according to claim 19 wherein the identifying device (e) further comprises a device which uses the predicted segmentation to designate further portions of the predicted segmentation as incorrectly predicted.

25. An apparatus according to claim 24 wherein said identifying means (e) is arranged such that further portions designated as incorrectly predicted are those portions which lie at borders of regions in the predicted segmentation.

26. An apparatus according to claim 19, wherein said modifying device (f) includes a device which assigns incorrectly predicted portions to existing regions dependent upon the assigned regions of neighbouring portions.

27. An apparatus according to claim 26 wherein the modifying device (f) includes a device which assigns at least some of the incorrectly predicted portions to the same regions as correctly predicted neighbouring portions in dependence upon pixel data gradients in the current frame.

28. An apparatus according to claim 27 wherein the modifying device (f) is arranged such that incorrectly predicted portions having gradients above a threshold are assigned to the same regions as neighbouring portions in dependence upon the assignments and gradients of said neighbouring portions.

29. An apparatus according to claim 26, wherein the modifying device (f) is arranged such that at least some of the incorrectly predicted portions are assigned to the same regions as correctly predicted neighbouring portions in dependence upon statistics of the pixel data for those regions.

30. An apparatus according to claim 19 adapted such that the current frame of interest and the obtained segmentation are utilised by devices (a) to (f) as the reference frame and the reference frame segmentation to obtain the consistent segmentation for a subsequent frame of interest.

31. An apparatus according to claim 19 arranged such that the image frame sequence comprises a motion picture.

32. An apparatus according to claim 19 further comprising:
 (a) a device which processes pixel data of the current image frame in accordance with the current frame segmentation obtained by the modifying device (f); and
 (b) a device which outputs a signal conveying the processed pixel data.

33. An apparatus according to claim 32 further comprising a device which directly or indirectly records said processed pixel data on or in a recording medium.

34. An apparatus according to claim 32 wherein said processing device is an encoder for encoding the frame of interest with compression using the obtained segmentation.

35. An apparatus according to claim 34 wherein the encoded frame includes a representation of the obtained segmentation.

36. An apparatus according to claim 34 further comprising a device which uses said obtained segmentation to control the allocation of bandwidth to different portions of the image.

* * * * *